INVENTOR
Roe R. Black

March 12, 1968  R. R. BLACK  3,372,958
AUTOMATIC FEEDER FOR PNEUMATIC CONVEYING LINES
Filed May 2, 1966  3 Sheets-Sheet 3
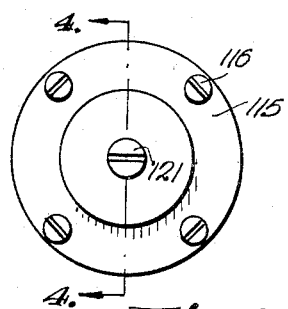
Fig. 3.
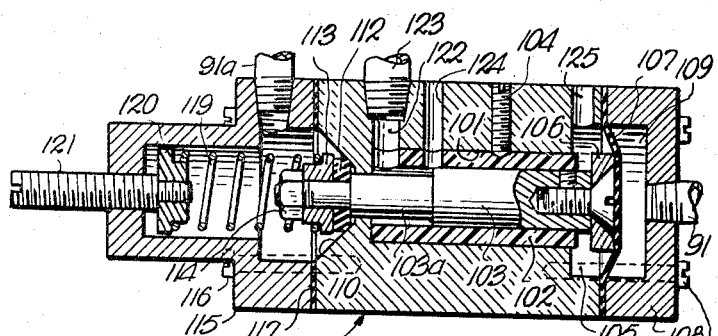
Fig. 4.
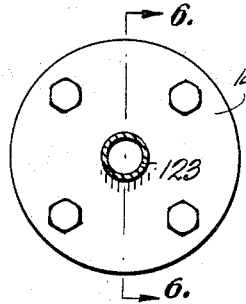
Fig. 5.
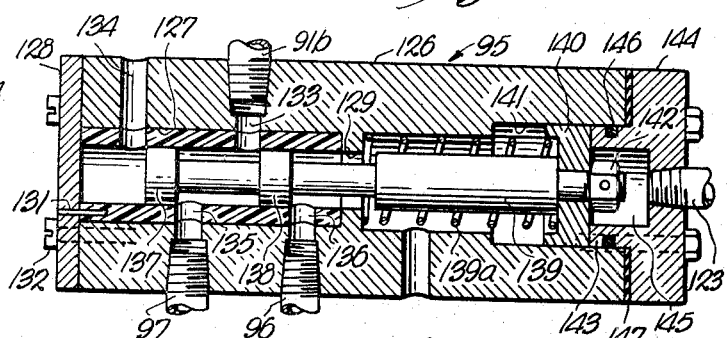
Fig. 6.
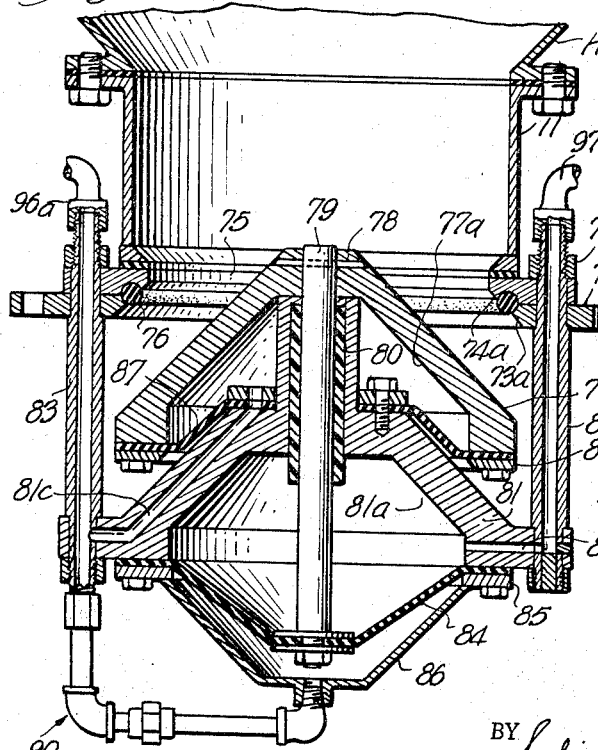
Fig. 7.
Fig. 8.
INVENTOR
Roe R. Black
BY Scofield, Kokjer, Scofield & Lowe
ATTORNEYS

# United States Patent Office 3,372,958
Patented Mar. 12, 1968

3,372,958
AUTOMATIC FEEDER FOR PNEUMATIC CONVEYING LINES
Roe R. Black, Aurora, Nebr., assignor to York Manufacturing Company, a corporation of Nebraska
Filed May 2, 1966, Ser. No. 546,883
6 Claims. (Cl. 302—53)

ABSTRACT OF THE DISCLOSURE

A hopper with a bottom feed to a pneumatic conveying line is provided with an inlet and a valve controlling said inlet. The valve is operated automatically alternately to admit product to the hopper and to seal the inlet opening, the complete cycle being repeated several times a minute. Control of the inlet valve is in response to pressure conditions within the hopper which alternate between positive and negative pressure, positive pressure being applied to unload the hopper and negative pressure to assist in loading.

---

This invention relates generally to the pneumatic conveying of particulate or pulverulent products and refers more particularly to an automatic feeder for injecting such product in intermittent increments to a pneumatic conveying line.

In summary, the invention provides a feeder comprising a small vessel or tank through the top of which is drawn by partial vacuum a small supply of dry product from a source of such product. The product is discharged through the bottom of the vessel by positive pressure into the air stream of a conveying line. The loading and discharge cycle takes place automatically several times a minute, the rate of feed depending upon product and conveying distance. There are no filters or screws or rotary valves or other working parts to be damaged by abrasive products. The unit is completely portable and requires no special installation work. The feeder will handle any free flowing powdered or granular product and is particularly useful for highly abrasive products such as sand, chemicals, cement and the like.

One of the main objects of the invention is to provide a feeder of the character described which delivers controlled increments of materials to a main conveying line without requiring any source of power other than air supplied from a blower which is also utilized for conveying the material through the line. In the instant invention all valving and control functions are achieved through use of pneumatic air flow and pressure alone; no electric switches or other electric controls are required nor are electric valve components or the like.

Another object of the invention is to provide a materials feeder of the character described having a vessel which is filled by suction assistance, yet which does not require the use of the suction side of a blower to obtain the necessary suction in the vessel. In my invention the suction for loading the vessel is created by utilizing the air discharge from the blower and directing it through a special venturi throat arrangement to set up an induced suction. The unique design of the venturi throat and associated structure allows dusty air and even product to be passed into the conveying air stream without a filter.

A further object of the invention is to provide a materials feeding arrangement of the character described by which a high conveying capacity, for example, up to 60 tons per hour, can be achieved while using a materials holding vessel of only five cubic feet capacity. Through my invention, efficient pneumatic feeding of materials from large capacity transport units such as railway cars or trucks can be efficiently achieved. The size of the vessel is such as to require only a very small working space and the size furthermore provides portability to the unit.

A further object of the invention is to provide a materials feeding arrangement in which the feeding automatically shuts off in the event of plugs or stoppages in the conveying line for so long as such condition remains, and in which conveying will be immediately renewed automatically when the condition is cured.

Still another object of the invention is to provide an automatic incremental feeder having controls which are operable under severe dust and climate conditions.

Other and further objects of the invention, together with the features of novelty appurtenant thereto, will appear in the course of the following description.

In the accompanying drawings, which form a part of the specification and are to be read in conjunction therewith, and in which like reference numerals indicate like parts in the various views;

FIG. 3 is an enlarged end elevational view of the timer;

FIG. 4 is a sectional view taken along line 4—4 of FIG. 3 in the direction of the arrows;

FIG. 5 is an enlarged end elevational view of the cycling valve;

FIG. 6 is a sectional view taken along line 6—6 of FIG. 5 in the direction of the arrows;

FIG. 7 is an enlarged vertical sectional view showing a top closure arrangement for the main vessel according to the invention; and FIG. 8 is a sectional view taken along line 8—8 of FIG. 1 in the direction of the arrows.

Figure 1:
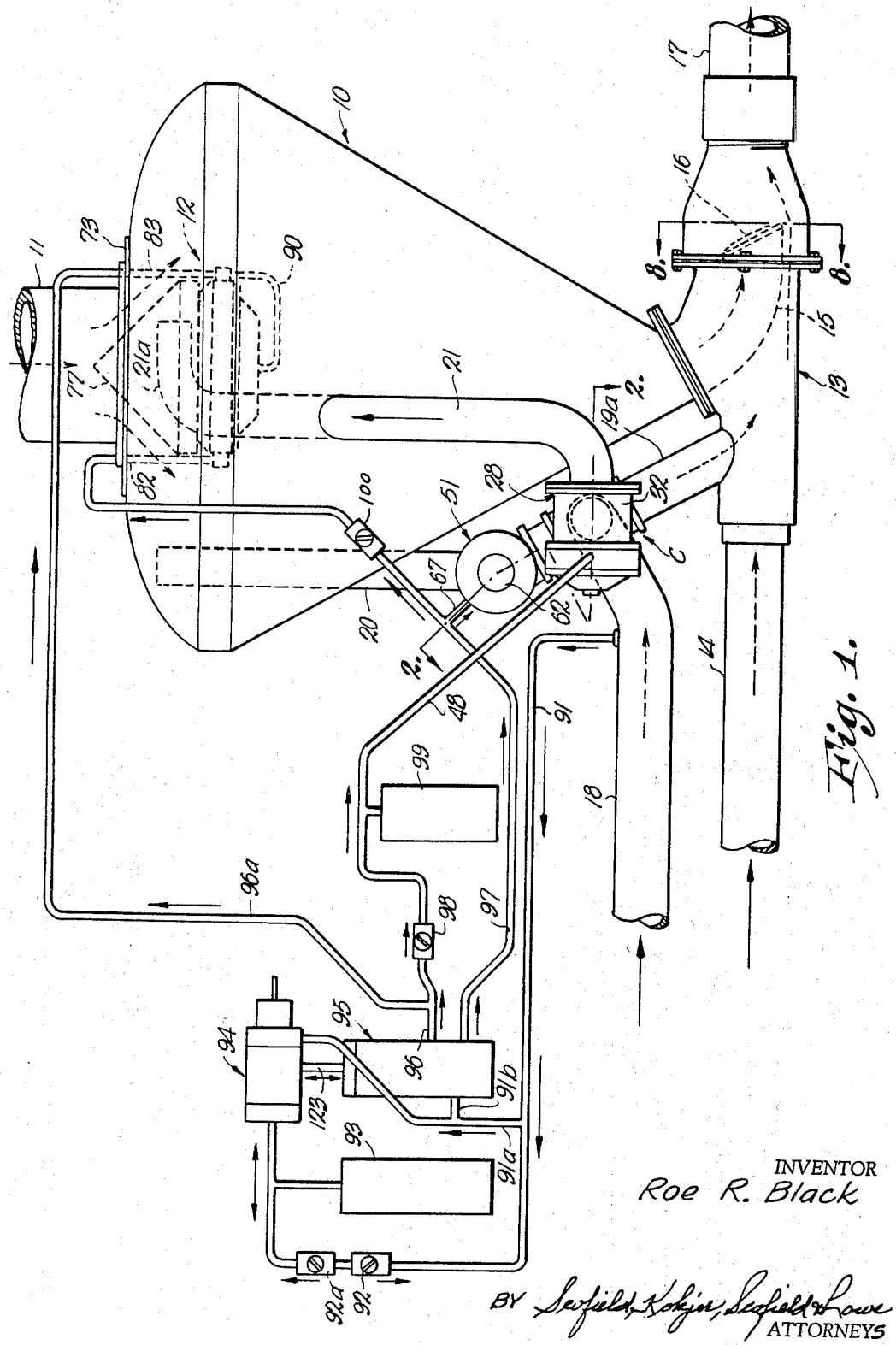
FIG. 1 is a schematic representation of a preferred system embodying the invention.

Referring now to the drawings, and initially to FIG. 1, reference numeral 10 identifies a generally conical vessel having an inlet opening at the upper end to which is connected a materials input or supply conduit 11. Instead of an elongate conduit the member 11 can just as well be the lower end of a tapered hopper or like structure capable of holding and guiding powder or granular materials to the top opening of vessel 10. Ingress of materials through the top opening is intermittent, the flow being controlled by means of a cone valve assembly 12, the details of which will later be described.

The lower end of vessel 10 is coupled into the side of an elongate generally tubular member 13, which in turn is coupled into a main air line 14 coming from a suitable source of pressurized air, most conveniently a blower (not shown). A curved elbow 15 (see FIG. 8) serves to form a discharge passage from the lower end of the vessel 10 into the interior of member 13, through which material flows from the hopper. The lower end of the discharge passage is covered by a hinged flap valve 16 which opens and closes responsive to changes in pressure within vessel 10 during operation.

The member 13 is constructed interiorally to provide a generally semi-annular flow path around the elbow 15 (see FIG. 8) which communicates downstream with the discharge line 17, which may be a hose or other discharge line leading to the intended location for depositing material.

Air is intermittently supplied to the vessel 10 through the air line 18 from a second blower (not shown) or other source of pressurized air. While it is possible to use a single blower, in which case line 14 would be plugged or eliminated, for reasons which will subsequently appear I prefer to use two separate blowers.

The air is delivered from line 18 to a valve and flow control assembly C, to be described in detail, which generally speaking, serves the following alternately timed functions in response to controls and conditions later to be described; (1) to impose a negative pressure (hereinafter called "suction") to the interior of vessel 10 through imposition of suction in line 20, which communicates with the interior of vessel 10 at the upper end; and (2) to impose a positive pressure (above atmospheric) within vessel 10 by supplying air thereto through an air input line 21. For reasons which will subsequently appear, the line 21 terminates inside the vessel in a horizontally disposed discharge nozzle 21a adjacent the side wall, the discharge nozzle being arranged generally tangentially with respect to the wall so as to induce a cyclonic flow within the vessel during air injection.

Figure 2:
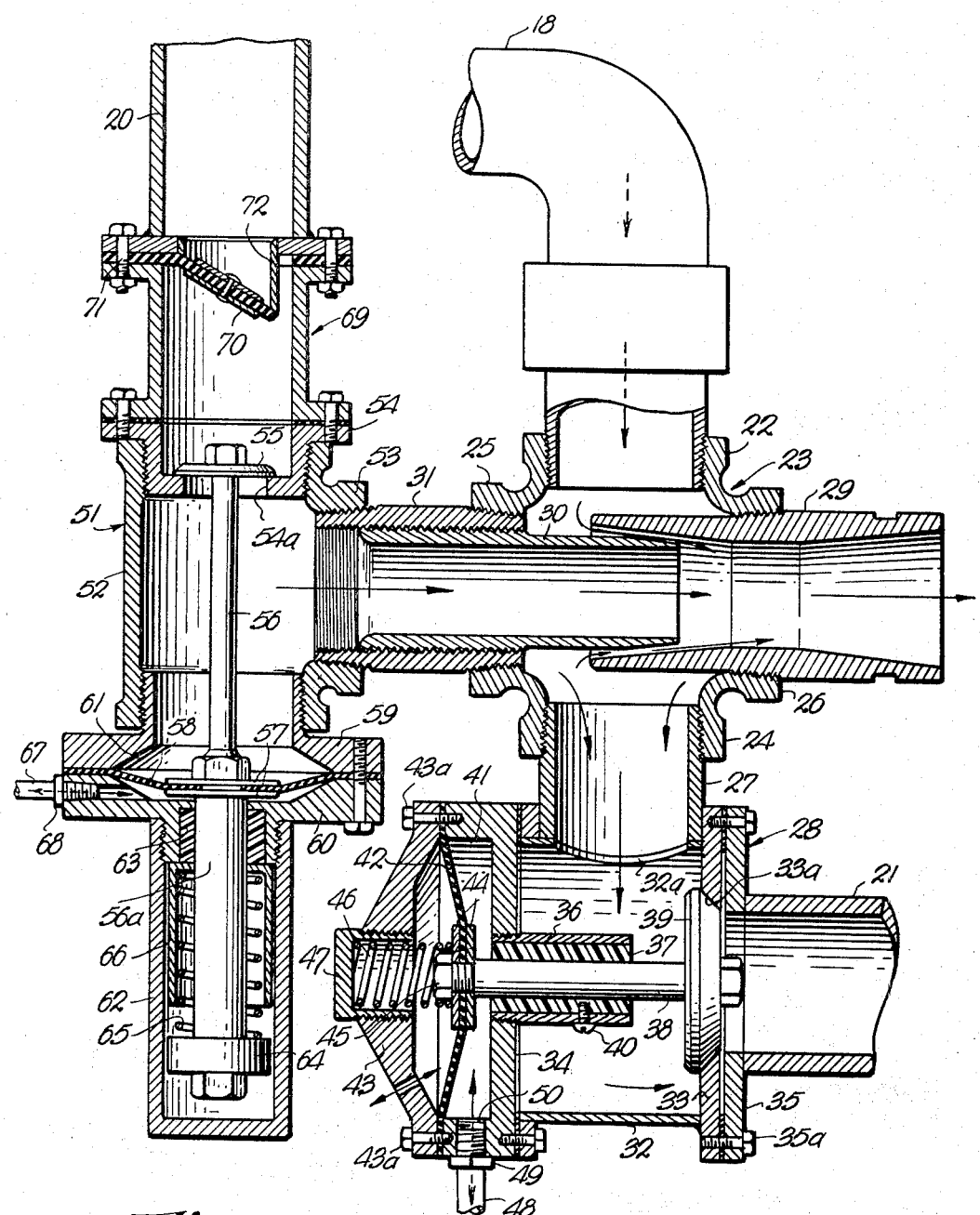
FIG. 2 is an enlarged composite sectional view taken generally along the irregular line 2—2 of FIG. 1 in the direction of the arrows.

The valve and flow control assembly C is shown in detail in FIG. 2. Line 18 is coupled into one port 22 of a multiported housing 23 having the three additional ports 24, 25 and 26. Port 24, which is opposite port 22, receives a coupling section 27 extending laterally from the side of a valve assembly 28. The latter can also be seen in FIG. 1. In FIG. 1, the housing 23 is obscured behind valve assembly 28.

The ports 25 and 26 of housing 23 are aligned with one another. Port 26 has threaded therein a tube-like member 29, the interior of which is tapered in diameter longitudinally from both ends toward the center to provide a venturi configuration. A smaller tube 30 entering the housing through port 25 extends axially into the inner tapered end section of the venturi member 29. The exterior of the inserted portion of tube 30 is of lesser diameter than the inside diameter of the adjacent venturi section within which it is received, thus to provide an annular passageway around tube 30 communicating with the interior of the housing. The tube 30 has a threaded portion which is engaged with interior threads in a coupling 31, which in turn is threaded into the port 25.

The valve assembly 28 (hereinafter sometimes called "discharge valve") serves to control the flow of air from line 18 into the vessel through line 21. It comprises a cylindrical housing 32 having an opening 32a connected with the coupler section 27. Circular closure plates 33, 34 are located at the opposite ends of the cylinder 32. The plate 33 has a tapered central opening providing a conical valve seat 33a. An outer closure plate 35 is coupled to plate 33 by means of cap bolts 35a. The line 21 is welded or otherwise secured to the annular plate 35.

The plate 34 has a threaded aperture therein into which is threaded the inwardly projecting sleeve 36. The sleeve contains an annular Teflon bearing 37 through which the valve stem 38 is axially received in a sliding fit. The valve stem 38 carries at its right hand end the poppet valve member 39 which is formed to seat on the seat 33a when the valve is closed. The Teflon sleeve 37 is secured against sliding and rotational displacement by a set screw 40 extending through the wall of sleeve 36 and threaded into the sleeve.

The valve stem 38 projects into a chamber 41 formed in plate 34. Forming a closure for this chamber is a flexible diaphragm 42 of circular configuration, the margin of the diaphragm being clamped between confronting annular end surfaces on plate 34 and a cap member 43. Cap bolts 43a serve to provide the necessary clamping force. The diaphragm 42 is centrally apertured to receive therethrough a threaded portion of the valve stem. Washers 44 lie on opposite sides of the diaphragm and encircle the threaded portion and a nut 45 holds the washers to the stem and to the diaphragm. The valve stem is urged toward closed position for the valve by a coiled compression spring 46 which bears against the outside washer 44 at one end and is retained at the other within a socketlike member 47 threaded into a central opening in the cap member 43.

Connected with chamber 41 is an air flow line 48. The flow line has a nipple 49 which is threaded into the port 50 in the side wall of chamber 41.

The valve controlling the suction imposed within vessel 10 by withdrawal of air through suction line 20 is indicated generally at 51. This valve (hereinafter sometimes called "suction valve") has as its main body the generally vertical tubular element 52 which includes a lateral port 53 into which is threaded the coupling section 31. An annular valve seat member 54 is threaded into the upper end of member 52; this has the central valve opening 54a. A circular poppet valve member 55 seats downwardly on the upper margin of valve opening 54a. The valve member 55 is carried at the upper end of a stem 56 extending centrally down through member 52 and connected by washers 57 at its other end to a flexible diaphragm 58. Diaphragm 58 is carried between two axially aligned matching parts 59 and 60 which cooperate to form a diaphragm chamber 61. Part 59 has a sleeve portion threaded into the lower end of member 52. Part 60 has a similar downward extension to which is threadably coupled the upper end of an elongate cap member 62 which surrounds a downward extension 56a from the diaphragm. Extension 56a is guided in a Teflon bearing 63. The extension 56a carries at its lower end an enlarged retainer collar 64. This collar serves as a retainer for the lower end of a coiled compression spring 65 encircling extension 56a and bearing at its upper end against the annular inner end portion of a tubular spring cage 66 which encircles the spring.

The spring 65 yieldably urges the valve toward its down position, i.e. a position in which valve member 55 is seated. Opening of the valve is effected by imposition of pressure on the underside of the diaphragm 58 through line 67 which is coupled through the fitting 68 to a port in the diaphragm clamping member 60.

Coupled with the valve seat member 54 at the upper end of the suction valve assembly is a back check valve arrangement 69 which includes the valving member 70. This member is preferably a flap cut from and integral with a ring portion 71 secured between the flanges of the valve assembly, the material of which the ring and integral ear are composed being one having good properties of flexural resiliency, e.g. rubber. The flap resiliently bears against and seals the lower end opening of a tube 72. Upon the occurrence of a negative pressure differential between the underside and topside of the valving member 70, it will flex open, thus permitting downward air flow through the check valve assembly. The resilience of the material of which valve member 70 is composed insures that under normal conditions, and in the absence of a pressure differential in the direction of opening, the valve will seat loosely against the lower end of tube 72, thus to close off flow in the upward direction through line 20.

The valve 12 for closing and opening the vessel to flow of materials into the vessel is detailed in FIG. 7. The bottom of the hopper is indicated at H and the discharge conduit from the hopper at 11. This conduit is seated on an annular top closure plate 73 which is adapted to be bolted to the top of the vessel. The plate 73 defines with a superposed annular plate 74 a central opening 75 communicating with the interior of the vessel. Plates 73 and 74 have aligned conical surfaces 74a, 73a, which provide a valve seat. A resilient O-ring 76 is mounted in the seat to provide a seal when the valve is closed.

The valving member comprises the conical element 77 which is secured by a cross pin 78 to an upstanding rod 79. Rod 79 is slidably guided for vertical movement in a Teflon sleeve bearing 80 which is carried by a casting 81. The casting 81 is supported from plates 73, 74 by means of the depending hollow supports 82 and 83.

The underside of casting 81 is recessed at 81a to provide a chamber whose lower end is closed by a flexible diaphragm 84. The diaphragm is clamped to the underside of casting 81 by clamping ring 85 which is joined to and forms a part of a bottom cap member 86. The diaphragm is connected at its center with the lower end of rod 79.

It will be observed that the underside of the cone valve member 77 is recessed to provide a chamber which is closed at its bottom by another flexible diaphragm 87. The diaphragm 87 is annular, having a central aperture which fits over the upwardly projecting portion of the casting 81 and is clamped to the casting by the clamping ring 88. The outer margin of diaphragm 87 is in turn clamped to the annular bottom edge of valve member 77 by a clamping ring 89. The diaphragm and the interior 77a of the valving member define a closed chamber.

The depending supports 82 and 83 provide air passageways for communication with the various chambers of the cone valve assembly. The interior of support 82 is connected with a passageway 81b which communicates with that chamber which is above diaphragm 84. The interior of support 83 communicates with a passageway 81c formed within the casting 81 and which runs upwardly to that chamber which is above the diaphragm 87. The lower end of support 83 is coupled with a right angled line 90 which in turn leads to the chamber defined between the cap member 86 and the lower diaphragm 84. Obviously, pressure applied to the interior of support 83 will be transmitted to the chamber above diaphragm 87 and to that below diaphragm 84 with the concurrent result that the valve member 77 will be raised. On the other hand, should valve member 77 be in a raised position, pressure transmitted through support 82 and passageway 81b to the chamber above diaphragm 84 will exert a downward return force on rod 79 thus pulling the cone valve 77 away from its seat. As will be seen, the air line connections necessary to operation in the foregoing manner are provided in the system.

Returning now to FIG. 1, and proceeding with the description of the control and operating system for the valve components heretofore described, it will be noted that a relatively small air conducting line 91 leads from the blower line 18 at a point fairly close to the valve assembly C. Air line 91 has interposed therein two adjustable metering valves 92, 92a of commercially available design, one serving to meter flow in one direction through the line and the other in the opposite direction. An accumulator 93 is connected into line 91 just ahead of a main timer 94, the details of which are shown in FIG. 3 and 4 and will be subsequently described. Air line 91 further has a branch 91a therefrom which extends to and is connected with the timer 94, but at a different port than the main line 91.

As will be seen, the main timer 94 serves to control the operation of a cycling valve 95. The details of this valve are shown and subsequently will be described in connection with FIGS. 5 and 6. For the present, it may be helpful to know that the purpose of the cycle valve is to set up a repeated cycle of sequential operations in the overall unit, the principal operations in the sequence being the closing of the cone valve assembly 12, the introduction to the now closed interior of vessel 10 of pressurized air through line 21, the discharge of the solids contents of the vessel through the discharge elbow 15 into member 13, establishment of vacuum in the vessel when the contents thereof have been discharged, and the reopening of the cone valve to admit a new charge of solids. These operations take place in response to conditions established from time to time in lines 96, 96a and 97 with respect to the cone valve 12 and lines 49 and 67 (which branches from 97) to the valve assembly C. It will be noted that a metering valve 98 is interposed in line 49 and this line also includes in conjunction therewith an accumulator 99. A metering valve 100 is interposed in line 97 between the branch 67 therefrom and the cone valve assembly.

Referring to FIGS. 2, 3 and 4, the timer 95 has as its main element a generally cylindrical barrel provided with an axial bore 101. A Teflon sleeve 102 is fitted within the bore of the barrel and slidably contained within the sleeve is a longitudinally displaceable valve spool 103.

The sleeve 102 is stabilized within the bore of the barrel by a set screw 104. As viewed in FIG. 4, the right hand end of the barrel is counterbored to provide an annular recess 105. A head 106 secured to the adjacent end of spool 103 occupies a portion of this recess. The head is centrally adjacent a flexible diaphragm 107. A cap member 108 is secured to the end of the barrel by cap bolts 108a and clamps the margin of the diaphragm against the annular end of the barrel. The interior of cap member 108 forms with the diaphragm 107 a sealed chamber 109 which is in communication with the air line 91.

At that end of the barrel opposite from diaphragm 107, the barrel is provided with a conical recess 110 terminating at its inner end in an opening 111 through which extends a reduced diameter portion 103a on the spool. Recess 110 serves as a seat for a resilient valving member 112 which is carried on the end of the spool, being retained thereon by a flanged retainer collar 113 and nut 114 which are received on a still further reduced diameter portion of the spool.

The end of the barrel is covered by a cap member 115 which is secured to the barrel by cap bolts 116, an annular gasket 117 being interposed between the confronting surfaces of the cap and barrel. Cap member 115 houses a compression spring 119 which bears against the flange of retainer collar 113 on the end of the valve spool. The other end of spring 119 is held by a retainer 120 carried at the inner end of a screw 121 threaded through an appropriate opening in the end of cap 115. Obviously, spring pressure exerted against the valve spool by spring 119 can be adjusted through screw adjustment of the screw 121. The branch line 91a from line 91 communicates with the interior of cap 115 through an appropriate port.

Returning to the central section of the valve assembly, the barrel and sleeve are ported to provide a passageway 122 which communicates with a line 123 which in turn leads to the end of the cycle valve 95 (see FIGS. 1 and 6). Adjacent passageway 122 is a bleed passageway 124 which, when the valve spool is in the normal position toward which spring 119 biases it, is partially closed by the shoulder formed by the reduced diameter portion 103 of the spool. Another bleed passageway 125 communicates with the chamber 105 on the inner side of diaphragm 107.

The details of the cycle valve assembly are shown in FIGS. 5 and 6. This valve has a main barrel 126 provided with a longitudinal bore portion 127 of uniform inside diameter which is closed at the left hand end (as viewed in FIG. 6) by the cap piece 128 and defined at its right hand end by the inwardly projecting annular flange 129. A Teflon sleeve 130 is fitted within bore 127, the sleeve being retained in fixed rotational position within the bore by means of a pin 131 connected with the cap 128 and projecting into the wall of the sleeve. The cap 128 is held in place by cap bolts 132 received in the end of the barrel.

The barrel and internal sleeve are apertured to provide a plurality of lateral pasageways communicating with the interior of sleeve 130, these pasageways being noted respectively at 133, 134, 135 and 136. Passageway 133 is connected with line 91b, passageway 136 with line 96 and passageway 135 with line 97. Passageway 134 is a bleed passageway to the atmosphere.

Slidable longitudinally within the barrel 126 is a spool valve member having the two spaced spools 137, 138 thereon. In the normal "closed" position of the valve, spools 137 and 138 operate to define between them a closed space communicating respectively with lines 91b and line 97, and also close off flow through line 91b to either the bleed passageway 134 or to line 96. Spools 137, 138 are carried on an elongate member 139 terminating in a reduced diameter extension at the right end and on which is sleeved a piston 140.

The piston 140 tightly but slidably engages the inside cylindrical wall 141 of a counterbore within barrel 126.

A nut 142 retains the piston in place on the valve member 139. A compression spring 143 continually biases the piston 140 to the right so that it seats against the inwardly projecting annular portion 144a of a cap member 144 on the right hand end of the barrel. Cap member 144 is interiorly apertured to provide a chamber 145 which is closed at its left hand end by the piston 140. The projection 144a is sealed against the counterbore 141 by means of the O-ring 146 and additional sealing between the cap and main body of the barrel is provided by the annular gasket 147.

Operation

In describing the operation of the preferred embodiment of the invention, it will be assumed first that the blowers supplying air through lines 18 and 14 are not yet in operation. The corresponding position for all parts of the unit are as follows. Cone valve 77 is in its down, or open, position. The suction valve 51 is closed, which is the condition therefor illustrated in FIG. 2. The discharge valve 28 is also closed, thus preventing any flow into line 21, since as seen in FIG. 2, spring 46 urges the valving member 39 against the seat 33a. The timer 94 is in the condition shown in FIG. 4, which is regarded as the closed condition, since valve member 112 is seated against the conical seat 110. The cycle valve 95 is in the condition illustrated in FIG. 6. This means that line 91b is connected with line 97 thus providing an air communication passageway to the cone valve support 82 (FIG. 7). Naturally, also, the flap valve 116 on the discharge elbow 15 from the vessel 10 is closed.

When the blowers are started, air from the blower connected with line 18 flows into the ported housing 23. Since valving member 39 within the discharge valve 28 is closed, all air must flow through the venturi passageway into fitting 29 and thus through line 19a into the main conveying line housing 13. Because of the restriction provided by the venturi, the back pressure will build up in line 18. The pressure is determined by the longitudinal setting of the tapered jet 30 in the tapered inlet to fitting 29. The air moving into and through the venturi provided in section 29 creates a strong induced vacuum in tube 30, which vacuum is transmitted to the interior of the suction valve housing 52. This vacuum acts on flexible diaphragm 58, but is insufficient by itself to open the suction valve against the pressure of spring 65 combined with the force resulting from the pressure differential across the suction valve member 55.

It will be remembered that pressure has been built up in line 18 because of the restriction at the venturi throat. This pressure is transmitted through line 91 to branches 91a and 91b and then through the cycle valve 95 to lines 96, 97. The pressure in line 97 is transmitted through the line 67 to the underside of diaphragm 58 in suction valve 51, thus to raise stem 56 and open the suction valve. It also is transmitted through support 82 of the cone valve assembly 12 to the chamber immediately above the lower diaphragm 84. The metering valve 100 is included between line 67 and the cone valve assembly in order to delay the application of the opening of the cone valve until a partial vacuum has been imposed within the vessel 10.

The suction line valve 51 and cone valve stay open while the vacuum applied to the inside of the vessel through line 20 is exhausting the previous air there and drawing in a load of product through conduit 11. The intake of a load of product occupies usually from two to three seconds and during this period air pressure is slowly building up in the accumulator 93 just ahead of the timer 94. In other words, the full line pressure of line 91 is not transmitted directly to the head end of the timer, but is delayed by the metering valve 92a and accumulator 93. When the pressure within the accumulator tank 93 reaches the point when the pressure within chamber 109 in the timer 94 is great enough to overcome the resistance of spring 119 thus the force resulting from the pressure on the valve head transmitted through line 91a, the valve head 112 is unseated slightly. As a consequence, air leaks through the valve and out the bleed hole 124 of the timer to atmosphere until the continued increase of pressure on the diaphragm 107 opens the valve its full distance at the same time closing off the bleed hole so all the pressure pops down into the cycle valve through line 123.

When the pressure builds up and is transmitted as described through line 123 to the cycle valve 95, the piston 140 thereof is displaced inwardly, carrying with it the spools 137, 138. Upon shifting of the spools 137, 138, line 97 is connected to the bleed passageway 134 and line 96 is now coupled with the pressure input line 91b, all with the following consequences.

First, the connection of line 97 with atmosphere opens up an air bleed line from the cone valve assembly chamber above diaphragm 84, thus removing the resistance to raising of the cone valve 77. Secondly, pressure transmitted from input line 91b through the cycle valve to line 96 is applied to the cone valve raising chambers through support 83, passageway 81c and line 90. Thirdly, the pressure behind diaphragm 58 of the suction valve 51 is relieved through line 67 into line 97 and the suction valve will close. However, closing of the suction valve is delayed until the cone valve is closed. The reason will be understood by referring to FIG. 2. When the suction line is open the valve member 55 is raised off of the margin of opening 54a and the vacuum being generated by the venturi is imposed on the diaphragm 58. The spring 65, which urges valve stem 56 downwardly to close the suction valve, is not strong enough to overcome the vacuum force on diaphragm 58, and consequently even though pressure is bled from behind the diaphragm the suction valve will remain open. This "hold open" force is broken and the valve snaps shut under the influence of the spring when the discharge valve 28 opens and air under positive pressure enters the tank.

The reason for arranging matters such that the opening of the discharge valve is automatically delayed until the cone valve is tightly closed is to avoid the sudden blast of air into the tank coming from discharge from blowing back into the conduit 11 around the cone valve.

The desire to delay opening of the discharge valve means that the discharge valve 28 serves both as a timing valve and as a central poppet type valve for shutting off the air blast during the loading. Referring again to FIG. 2, it will be noted that when the poppet valve member 39 is seated on the inside of the valve chamber where the full pressure of the air in line 18 is applied at all times, the force on the valve member 39 resulting from the applied pressure, coupled with the force exerted by spring 46, holds the valve closed until sufficient pressure to overcome both builds up in chamber 41. Since the diaphragm 44 is larger in area than the valving member, even though the ultimate pressure in chamber 41 can be no higher than that acting on the valve member 39, the latter will be opened as the pressure builds up in chamber 44 to the required value.

When the discharge valve pops open, air immediately flows from the interior of housing 23 through coupling 27 and through the valve opening vacated by poppet member 39 into the vessel 10 through line 21. The partial vacuum in the tank is destroyed, the suction line valve 51 closes by the spring action earlier described, and pressure is built up in the vessel to cause discharge of the contents of the vessel down through the discharge elbow 15 into the conveying air stream proceeding through the housing 13 from line 14.

The period of discharge during which the load is forced into the air stream and conveyed on through hose 17 to its ultimate destination dicers with the size of the load and the length of the conveying line and also the volume of air provided by the blowers.

The conveying is, of course, aided materially by the air delivered from the blower connected with line 18 since this air proceeds on down into the chamber 13, both through the coupling line 19a and the bottom discharge 15 as soon as the material all has left the vessel. It will be evident, too, that the pressure in line 21 will be materially higher than that in line 14 and the materials receiving chamber 13 because of the venturi throat restriction which sets up back pressure in line 18. Also, the discharge from the venturi is directly into the mixing chamber 13, the back pressure of conveying line 17 is always present and the pressure required to force the air through the venturi throat is affected by this back pressure. If there is none, as is true when the line is completely clean or open, most of the air will be diverted from the jet throat into the tank because it requires less pressure for this air to pass into the tank than for it to force its way through the venturi throat. When approximately half of the total air volume from blower line 18 is diverted into the tank the balance can pass easily through the throat so the two streams of air, one through the vessel (pushing product with it) joins the flow through the throat into the chamber 13 and together they convey the load through the conveyor line.

As the back pressure of the material being moved through line 17 is reduced by reason of its more scattered entrainment in the line and lessening of resistance to flow, this reduces the pressure in the sening line 91 and eventually the return spring 119 in the timer 94 closes the main timer valve 112. Chamber 145 of the cycling valve is thereby connected with the bleed port 124 through line 123, thus permitting the cycling valve to return to its FIG. 6 position. For the reasons earlier described, the discharge valve 28 is thereby closed which in turn forces the air from line 18 all to flow through the venturi throat and thereby build up its pressure to create suction and open the cone valve and the suction line valve 51 in the manner earlier described. The vessel is thus recharged with product from conduit 11 and discharge takes place as before. The unit will continue to operate in this fashion automatically so long as normal conveying continues.

The period of suction loading is prefixed by means of adjustment of the meter 92a and may be from one second to whatever time up to several seconds is needed to get a full load. After once being determined, it is not necessary ordinarily to make any adjustments.

The period of discharge during which the load is forced into the main air stream and conveyed differs with the size of the load and the length of the conveying line and also the volume of air provided by the blowers. If only one blower is used, the discharge period is somewhat longer than if two blowers were used.

It is of importance to note that the period of discharge and conveying is determined entirely by the pressure required for moving the material through the line, which is always more than the setting of the timer return pressure. Consequently the timer stays open, and so does the cycle valve and its control over the cone valve and the discharge valve so long as the work of conveying requires more total p.s.i. than the p.s.i. at which the timer can close under its spring return pressure.

During discharge of material from the vessel 10, the air moving into and through the vessel as a consequence of discharge into the vessel through line 21, is moving in a cyclonic counterclockwise path. This has a substantial benefit as the last of the material is leaving the lower portion of the vessel and proceeding through the discharge elbow 15. The cyclonic action sets up a scouring effect which tends to effect substantially more efficient cleanout.

If for any unusual reason the conveying line is jammed during operation, such as a truck wheel running over or stopping on a rubber hose, no damage results, since the air under positive pressure from the blowers will simply blow off to atmosphere through the safety valves and the controls will stay open to discharge. When the jamming is removed, the regular conveying cycle will be newly initiated in the manner described.

As can be seen, all the air valves are designed to be dust proof and to operate without lubrication and under cold or hot conditions. Dust proofing is provided by sealing them completely, as with the suction line valve 51 and the cone valve assembly 12, or by keeping static pressure inside each at all times during the operation. All bleed holes of the timer and cycle valve have a continuous flow of air from inside outward and do not therefore suck in dust or allow dust to enter.

From the foregoing, it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In an automatic feeder for intermittently injecting measured increments of pulverulent products into a pneumatic conveying line with which said feeder is combined,
    a substantially closed vessel having a discharge opening and a product input opening,
    means connecting said discharge opening with the interior of said conveying line,
    product input valve means associated with said input opening,
    means for operating said input valve means to open and close said product input opening,
    means for introducing pressurized air to the interior of said vessel, said means including an air line, an air discharge line having one end communicating with the interior of said vessel, and air discharge valve means connecting said air line and the other end of said air discharge line,
    means for operating said air discharge valve means to open and shut off flow between said line and said vessel, and
    control means actuated responsive to the pressure in said air line and connected with the respective operating means, said control means operable to effect the closing and opening of said product input valve means and air discharge valve means in timed sequence whereby to intermittently load said vessel with product and discharge said load into said line,
    suction inducing means connected with said air line and having a suction opening,
    a suction line communicating at one end with the interior of said vessel,
    suction valve means connecting said suction line with said suction opening,
    means for operating said suction valve means to open and close same,
    said control means also connected with said means for operating said suction valve and operable to effect the closing and opening of said suction valve in substantially reverse sequence and timing to the closing and opening of said air discharge valve means, and
    a discharge valve operable to open and close said discharge opening so that said discharge opening is closed during the time said suction valve is open and said discharge opening is open during the time said air discharge valve is open.

2. The combination as in claim 1,
    said control means operable to delay opening of said air discharge valve means until said product input valve means has closed the input opening.

3. The combination as in claim 1, said suction inducing means comprising a casing having extending therethrough a venturi throat assembly providing a restricted air path through the throat, said assembly of a size permitting air flow therearound to another outlet in the casing, said air discharge valve connected with said last named outlet, said venturi throat having its outlet end connected with said conveyor line ahead of the connection with said vessel.

4. The combination as in claim 1, said air line having interposed therein ahead of said air discharge valve means a casing having a restricted outlet and a discharge outlet, said air discharge valve connected with said discharge outlet, said restricted outlet connected with said conveyor line ahead of the connection with said vessel.

5. In an automatic feeder for intermittently injecting measured increments of pulverulent products into a pneumatic conveying line with which said feeder is combined, a substantially closed vessel having a discharge opening and a product input opening, means connecting said discharge opening with the interior of said conveying line, product input valve means associated with said input opening, means for operating said input valve means to open and close said product input opening, means for introducing pressurized air to the interior of said vessel, said means including an air line, an air discharge line having one end communicating with the interior of said vessel, and air discharge valve means connecting said air line and the other end of said air discharge line, means for operating said air discharge valve means to open and shut off flow between said line and said vessel, said air line having interposed therein ahead of said air discharge valve means a casing having extending therethrough a venturi throat assembly providing a restricted air path through the throat, said assembly of a size permitting air flow therearound to an outlet in the casing, said air discharge valve connected with said last named outlet, said venturi throat having its outlet end connected with said conveyor line ahead of the connection with said vessel, means for operating said air discharge valve means to open and shut off flow between said line and said vessel, and control means actuated responsive to the pressure in said air line and connected with the respective operating means, said control means operable to effect the closing and opening of said product input valve means and air discharge valve means in timed sequence, thereby to intermittently load said vessel with product and discharge said load into said line.

6. The combination as in claim 5, a suction valve connected with said throat, and a suction line controlled by said valve, said suction line extending into said vessel.

References Cited

UNITED STATES PATENTS

| 1,935,843 | 11/1933 | Goebels | 302—53 X |
| 2,032,367 | 3/1936 | Kennedy et al. | 302—53 |
| 2,380,651 | 7/1945 | Jeffery | 302—53 |
| 2,524,919 | 10/1950 | Meincke | 302—53 X |
| 2,616,766 | 11/1952 | Sanborn et al. | 302—53 |

RICHARD E. AEGERTER, *Primary Examiner.*

EVON C. BLUNK, *Examiner.*

M. L. AJEMAN, *Assistant Examiner.*